United States Patent
Kamiya

(10) Patent No.: US 11,190,067 B2
(45) Date of Patent: Nov. 30, 2021

(54) ROTOR OF MAGNET-EMBEDDED ELECTRIC MOTOR WITH MAGNET FIXED BY MAGNET FIXING AGENT AND MANUFACTURING METHOD OF ROTOR OF MAGNET-EMBEDDED ELECTRIC MOTOR

(71) Applicant: FANUC CORPORATION, Yamanashi (JP)

(72) Inventor: Yohei Kamiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 156 days.

(21) Appl. No.: 16/459,695

(22) Filed: Jul. 2, 2019

(65) Prior Publication Data

US 2020/0014258 A1    Jan. 9, 2020

(30) Foreign Application Priority Data

Jul. 6, 2018 (JP) .............................. JP2018-129482

(51) Int. Cl.
*H02K 1/27* (2006.01)
*H02K 15/03* (2006.01)

(52) U.S. Cl.
CPC ............. *H02K 1/276* (2013.01); *H02K 15/03* (2013.01)

(58) Field of Classification Search
CPC ....... H02K 1/276; H02K 1/28; H02K 2201/06
USPC ............. 310/156.56, 156.57, 156.46, 156.47
See application file for complete search history.

(56) References Cited

U.S. PATENT DOCUMENTS

| | | | |
|---|---|---|---|
| 2009/0127961 A1* | 5/2009 | Pedersen ................ | H02K 1/276 310/156.53 |
| 2016/0308412 A1* | 10/2016 | Honjo .................... | H02K 15/03 |
| 2018/0309334 A1* | 10/2018 | Okamoto ............. | H02K 1/2766 |

FOREIGN PATENT DOCUMENTS

| | | | |
|---|---|---|---|
| JP | 2001258187 A | | 9/2001 |
| JP | 2009512413 A | | 3/2009 |
| JP | 2012060773 A | * | 3/2012 |
| JP | 2012060773 A | | 3/2012 |
| JP | 201763610 A | | 3/2017 |
| WO | 2016024325 A1 | | 2/2016 |
| WO | 2017073275 A1 | | 5/2017 |
| WO | 2017221341 A1 | | 12/2017 |

OTHER PUBLICATIONS

Machine translation of JP-2012060773-A. (Year: 2012).*
(Continued)

*Primary Examiner* — Michael Andrews
(74) *Attorney, Agent, or Firm* — Fredrikson & Byron, P.A.

(57) ABSTRACT

A rotor core of a magnet-embedded electric motor includes a first tubular member and a second tubular member coaxially fixed to a shaft. The first tubular member includes a magnet fixing hole in which the magnet is fixed and a recess formed in an outer circumferential surface. The second tubular member includes a magnet fixing hole in which the magnet is fixed. The magnet fixing hole includes an arrangement region where the magnet is arranged, and an escape region having a size that allows magnet fixing agent to accumulate. The arrangement region of the first tubular member communicates with the arrangement region of the second tubular member, and the recess of the first tubular member communicates with the escape region of the second tubular member.

4 Claims, 13 Drawing Sheets

(56) References Cited

OTHER PUBLICATIONS

English Abstract and Machine Translation for Japanese Publication No. 2017-063610 A, published Mar. 30, 2017, 10 pgs.
English Machine Translation for Japanese Publication No. 2009-512413 A, published Mar. 19, 2009, 8 pgs.
English Abstract and Machine Translation for Japanese Publication No. 2001-258187 A, published Sep. 21, 2001, 12 pgs.
English Abstract and Machine Translation for Japanese Publication No. JP 2012-060773 A, published Mar. 22, 2012, 49 pgs.
English Abstract and Machine Translation for International Publication No. WO 2016/024325 A1, published Feb. 18, 2016, 10 pgs.
English Abstract and Machine Translation for International Publication No. WO 2017/073275 A1, published May 4, 2017, 8 pgs.
English Abstract and Machine Translation for International Publication No. WO 2017/221341 A1, published Dec. 28, 2017, 9 pgs.

* cited by examiner

ROTOR OF MAGNET-EMBEDDED ELECTRIC MOTOR WITH MAGNET FIXED BY MAGNET FIXING AGENT AND MANUFACTURING METHOD OF ROTOR OF MAGNET-EMBEDDED ELECTRIC MOTOR

BACKGROUND OF THE INVENTION

1. Field of the Invention

The present invention relates to a rotor of a magnet-embedded electric motor with a magnet fixed by magnet fixing agent, and a manufacturing method of the rotor of a magnet-embedded electric motor.

2. Description of the Related Art

An electric motor includes a stator fixed to a housing, and a rotor disposed in an interior of the stator. Among the various types of electric motors, there is known an electric motor including a permanent magnet fixed to the rotor. In this electric motor, the rotor includes a rotor core fixed to a shaft, and the magnet is fixed to the rotor core. In a technique in the related art, there is known an electric motor that includes a rotor in which a magnet is fixed to a surface of a rotor core (for example, Japanese Unexamined Patent Publication (Translation of PCT Application) No. 2009-512413T).

On the other hand, in a technique in the related art, there is known an electric motor that includes a rotor in which a permanent magnet is embedded in a rotor core (for example, Japanese Unexamined Patent Publication No. 2017-63610A and Japanese Unexamined Patent Publication No. 2001-258187A). An electric motor provided with such a rotor is referred to as a magnet-embedded electric motor. When a rotor of a magnet-embedded electric motor is manufactured, a rotor core is manufactured in which a hole for inserting the magnet is formed. The magnet can be embedded in the rotor core by inserting the magnet with magnet fixing agent to the hole of the rotor core.

SUMMARY OF THE INVENTION

In the manufacturing process of the magnet-embedded electric motor, a plurality of magnet fixing holes are formed in the rotor core in a circumferential direction of the rotor core. The plurality of magnet fixing holes extend from one end face to the other end face in an axial direction of the rotor core. Each magnet is arranged in the rotor core by pushing the magnet into the magnet fixing hole from one end face toward the other end face. In this case, magnets having the same length as a length in an axial direction of the rotor core can be used. In order to insert the magnet into the magnet fixing hole of the rotor core, the magnet needs to be inserted into the magnet fixing hole at a long distance. Also, due to the viscosity of the magnet fixing agent, the resistance increases when the magnet is inserted into the magnet fixing hole of the rotor core. As a result, there is a problem that insertion of the magnet takes a long time.

Alternatively, the magnet can be divided into lengths equivalent to half the length in the axial direction. Then, a magnet can be inserted from one end face of the rotor core, and subsequently a magnet can be inserted from the other end face. However, when the magnet is inserted from one end face, excess magnet fixing agent included in the magnet fixing agent applied to the magnet remains in a center portion of the magnet fixing hole in the axial direction. When a magnet is inserted from the other end face, the magnet may not be able to be pushed to a prescribed position due to the magnet fixing agent remaining in the center portion. Or, there is a problem that a static balance or a dynamic balance of the rotor is deteriorated due to different amounts of magnet fixing agent remaining in the center portions of the plurality of magnet fixing holes.

Thus, in the process of manufacturing the rotor of the magnet-embedded electric motor, the problem arises that a process for inserting the magnet into the magnet fixing hole of the rotor core is difficult.

A rotor of a magnet-embedded electric motor according to one aspect of the present disclosure includes a shaft configured to rotate about a rotation axis, a rotor core fixed to the shaft, and a magnet fixed in the rotor core. The rotor core includes a first tubular member and a second tubular member coaxially fixed to the shaft. The first tubular member includes a plurality of magnet fixing holes in which magnets are fixed respectively by magnet fixing agent, and a recess formed between the magnet fixing holes in an outer circumferential surface and extending along the rotation axis. The second tubular member includes a plurality of magnet fixing holes in which magnets are fixed respectively by magnet fixing agent. The magnet fixing hole includes an arrangement region where the magnet is arranged, and an escape region formed on a side of the arrangement region and having a size configured to allow the magnet fixing agent to accumulate. The second tubular member is fixed offset from the first tubular member in a circumferential direction so that the arrangement region of the first tubular member communicates with the arrangement region of the second tubular member, and the recess of the first tubular member communicates with the escape region of the second tubular member.

A manufacturing method of a rotor of a magnet-embedded electric motor according to one aspect of the present disclosure includes a fixation step of fixing a first tubular member and a second tubular member to a shaft along a rotation axis of the shaft. The manufacturing method of a rotor includes an insertion step of inserting magnets into a magnet fixing hole of the first tubular member and a magnet fixing hole of the second tubular member. The first tubular member includes a plurality of magnet fixing holes configured to fix magnets respectively by magnet fixing agent, and a recess formed between the magnet fixing holes in an outer circumferential surface and extending along the rotation axis. The second tubular member includes a plurality of magnet fixing holes configured to fix magnets respectively by magnet fixing agent. The magnet fixing hole includes an arrangement region where the magnet is arranged, and an escape region formed on a side of the arrangement region and having a size configured to allow the magnet fixing agent to accumulate. The fixation step includes a step of fixing the first tubular member and the second tubular member while the second tubular member offsets from the first tubular member in a circumferential direction so that the arrangement region of the first tubular member communicates with the arrangement region of the second tubular member and the recess of the first tubular member communicates with the escape region of the second tubular member. The insertion step includes a step of inserting a magnet into the arrangement region of the first tubular member so as to extrude excess magnet fixing agent into the magnet fixing hole of the second tubular member. The insertion step includes a step of inserting a magnet into the arrangement region of the second tubular member so as to extrude excess magnet fixing agent into the recess of the first tubular member. The insertion step includes a step of removing the magnet fixing agent extruded into the recess of the first tubular member.

DETAILED DESCRIPTION

A rotor of a magnet-embedded electric motor and a manufacturing method of a rotor of a magnet-embedded electric motor according to an embodiment will be described with reference to FIG. 1 to FIG. 13. An electric motor according to the present embodiment is a magnet-embedded electric motor in which a magnet is embedded in a rotor core. The magnet-embedded electric motor of the present embodiment has a structure in which a magnet can be easily inserted into a magnet fixing hole of the rotor core in a manufacturing process.

Figure 1:
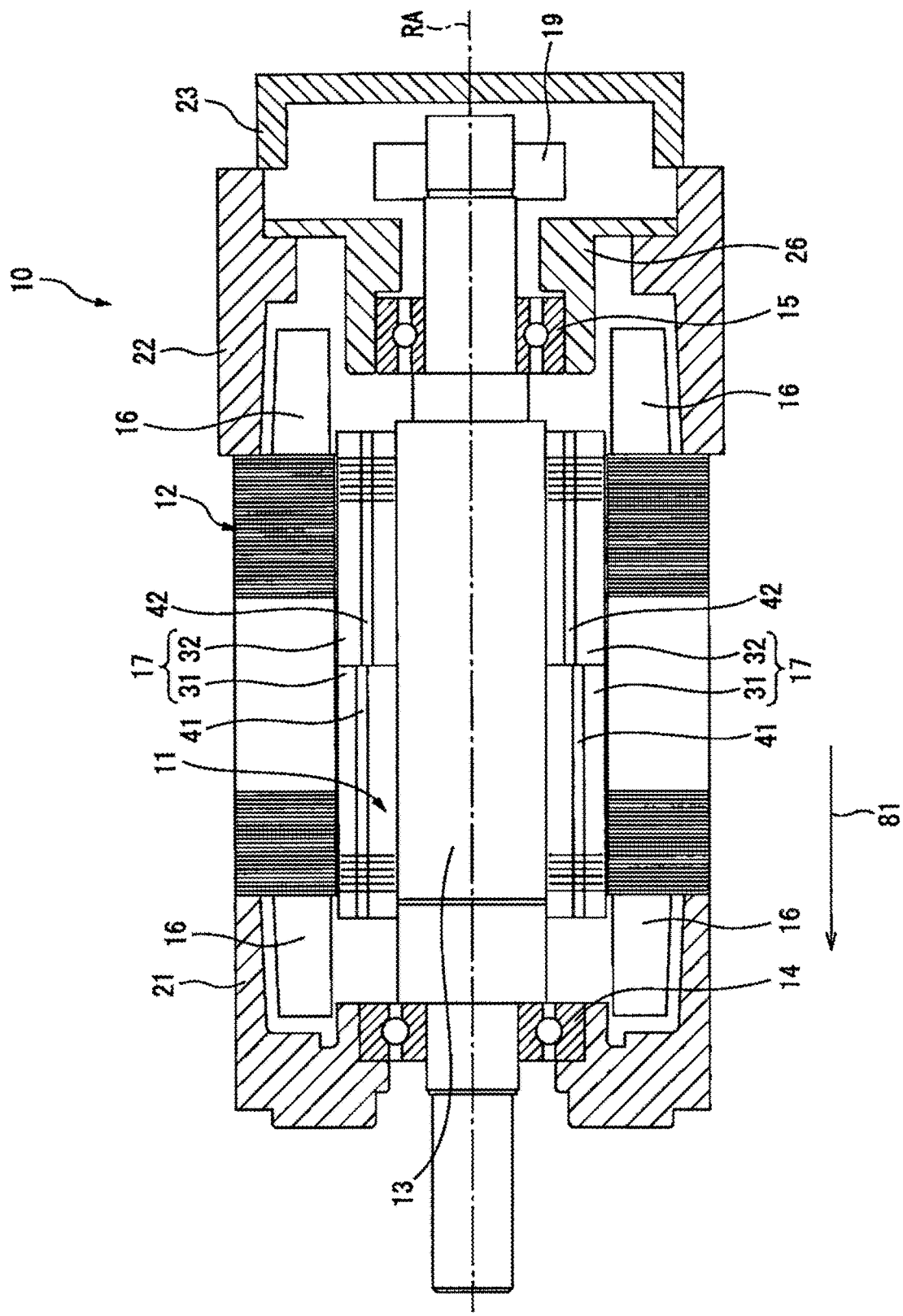
FIG. 1 is a schematic partial cross-sectional view of an electric motor of an embodiment.

FIG. 1 is a cross-sectional view of the electric motor of the present embodiment. An electric motor 10 includes a rotor 11 and a stator 12. The stator 12 is made of, for example, a plurality of electromagnetic steel plates stacked in an axial direction. A coil 16 is wound around the stator 12. The rotor 11 includes a shaft 13 formed into a rod shape, a rotor core 17 fixed to an outer circumferential surface of the shaft 13, and a plurality of magnets 41, 42. The magnets 41, 42 in the present embodiment are permanent magnets.

The shaft 13 is coupled with another member for transferring a rotational force. The shaft 13 rotates about a rotation axis RA. The axial direction of the present embodiment refers to a direction in which the rotation axis RA of the shaft 13 extends. A radial direction of the present embodiment refers to a radial direction of a circle with the rotation axis RA serving as the center. A circumferential direction of the present embodiment refers to a direction of a circumference of the circle with the rotation axis RA serving as the center. Further, in the electric motor 10, a side on which the shaft 13 is coupled with another member is referred to as a front side. Also, a side opposite to the front side is referred to as a rear side. In the example illustrated in FIG. 1, an arrow 81 indicates the front side of the electric motor 10.

The electric motor 10 includes a front housing 21 and a rear housing 22 as housings. The stator 12 is fixed to the housings 21, 22. The housings 21, 22 rotatably support the rotor 11 via bearings 14, 15.

The housing 22 is formed into a tubular shape. A bearing support member 26 that supports the bearing 15 is fixed to the housing 22. The bearing 15 supports a section on the rear side of the shaft 13. The housing 21 is formed into a tubular shape. The housing 21 supports the bearing 14. The bearing 14 supports a section on the front side of the shaft 13. An encoder 19 for detecting a rotational position or a rotational speed of the shaft 13 is disposed at an end of the shaft 13 on the rear side. A rear cover 23 that closes a space in an interior of the housing 22 is fixed to an end of the housing 22 on the rear side.

Figure 2:
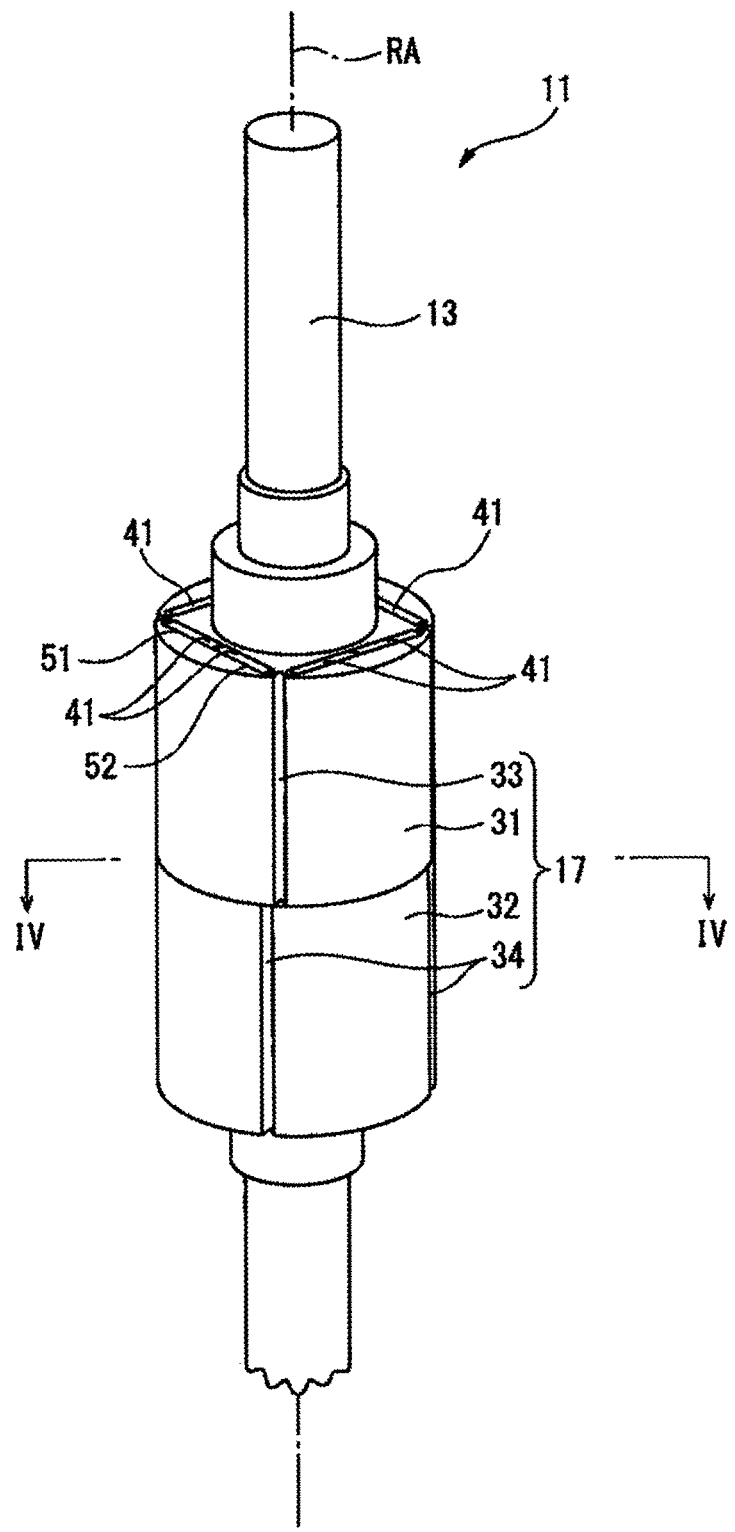
FIG. 2 is a perspective view of a rotor of the embodiment.

FIG. 2 illustrates a perspective view of the rotor of the electric motor of the present embodiment. With reference to FIG. 1 and FIG. 2, the rotor 11 rotates about the rotation axis RA. The rotor core 17 of the present embodiment includes a first tubular member 31 and a second tubular member 32 coaxially disposed about the rotation axis RA. Each of the first tubular member 31 and the second tubular member 32 is formed into a cylindrical shape. The tubular members 31, 32 of the present embodiment are each formed by stacking a plurality of electromagnetic steel plates in the axial direction of the rotation axis RA. The tubular members 31, 32 are formed of, for example, a soft magnetic material.

Figure 3:
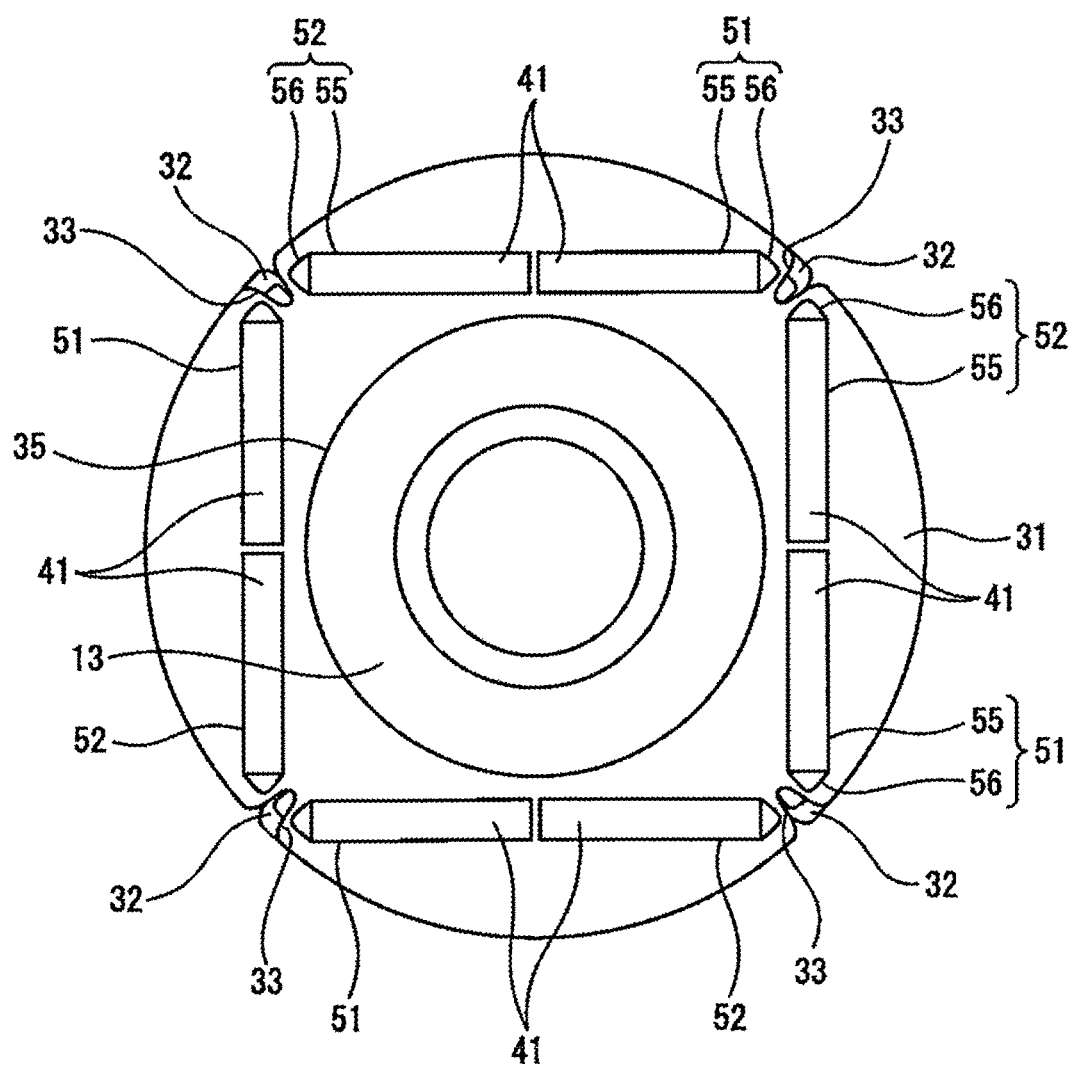
FIG. 3 is a plan view of the rotor of the embodiment.

FIG. 3 is a plan view of the rotor of the present embodiment. With reference to FIG. 1 to FIG. 3, a plurality of magnet fixing holes are formed in the tubular member of the present embodiment. The magnet fixing holes each extend from one end face to the other end face in the axial direction of the tubular member.

The first tubular member 31 includes a first magnet fixing hole 51 and a second magnet fixing hole 52. The magnet 41 is fixed in each of the magnet fixing holes 51, 52 by magnet fixing agent. The magnet fixing agent includes a substance which is liquid in an initial state and cures afterward so as to fix the magnet. For example, the magnet fixing agent includes an adhesive, an epoxy resin, a putty, and etc. The magnet fixing holes 51, 52 are formed along an outer circumference of the first tubular member 31 in a plan view of the rotor 11. In the present embodiment, the magnet fixing holes 51, 52 are each formed so as to extend in a direction substantially orthogonal to the radial direction of the shaft 13 in a plan view. Each of the magnet fixing holes 51, 52 is disposed so as to surround the shaft 13.

In the rotor 11 of the present embodiment, a pair of the magnet fixing holes are formed by one first magnet fixing hole 51 and one second magnet fixing hole 52. In the present embodiment, a plurality of pairs of magnet fixing holes are formed. In the example illustrated in FIG. 3, four pairs of magnet fixing holes are formed. In one pair of magnet fixing holes, the first magnet fixing hole 51 and the second magnet fixing hole 52 are disposed in the same plane. The first magnet fixing hole 51 and the second magnet fixing hole 52 are oriented in opposite directions. The plurality of pairs of magnet fixing holes are disposed at equal intervals in the circumferential direction of the first tubular member 31. Alternatively, the pairs of magnet fixing holes are arranged for each predetermined central angle.

The magnet fixing holes 51, 52 each include an arrangement region 55 in which the magnet 41 is arranged. The arrangement region 55 has a shape corresponding to a shape of the magnet 41. The arrangement region 55 has a shape to which at least a portion of a surface of the magnet 41 adheres tightly. In the present embodiment, three surfaces of the magnet 41 are adhered tightly to a wall surface of the arrangement region 55.

The magnet fixing holes 51, 52 each include an escape region 56 formed on a side of the arrangement region 55. The escape region 56 has a size that allows excess magnet fixing agent to escape when the magnet 41 is inserted into the arrangement region 55 in the manufacturing process of the rotor 11. The escape region 56 has a size allowing accumulation of the magnet fixing agent. The escape region 56 in the present embodiment is a space in which the magnet 41 is not disposed. The escape region 56 is formed at each end of the pair of magnet fixing holes that faces an outer side. The escape region 56 is disposed near an outer circumferential surface of the first tubular member 31. The escape region 56 in the present embodiment is formed so that the cross-sectional shape is substantially triangular, but the embodiment is not limited to this. The escape region 56 can be formed so as to have any cross-sectional shape.

Note that, as long as the escape region 56 is disposed in any position as long as near the outer circumferential surface of the first tubular member 31, magnet fixing holes 51, 52 each are disposed at any position. For example, the shape of the pair of magnet fixing holes may be formed into a V-shape in a plan view. Further, in a plan view, the magnet fixing holes may be formed so as to extend in the radial direction of the shaft.

The first tubular member 31 includes a shaft insertion hole 35 into which the shaft 13 is inserted. The first tubular member 31 includes a recess 33 formed in the outer circumferential surface thereof. The recess 33 is formed so as to extend in the direction of the rotation axis RA. The recess 33 of the first tubular member 31 is formed from one end face to the other end face of the first tubular member 31. The recess 33 functions as an accumulation part in which the magnet fixing agent accumulates in the manufacturing process of the rotor as described later.

The recess 33 is formed in a region between the magnet fixing holes in the outer circumferential surface of the first tubular member 31. In the present embodiment, the recess 33 is formed between the pairs of magnet fixing holes adjacent to each other. In the example illustrated in FIG. 3, the first tubular member 31 includes four pairs of magnet fixing holes, and thus four recesses 33 are formed. The recess 33 is formed in a region between the escape region 56 of the first magnet fixing hole 51 and the escape region 56 of the second magnet fixing hole 52. The recesses 33 are formed at equal intervals in the circumferential direction of the first tubular member 31. As described later, the recess 33 has a depth that allows communication with an escape region 58 of the first magnet fixing hole 53 of the second tubular member 32 when the first tubular member 31 and the second tubular member 32 are fixed to the shaft 13.

Figure 4:
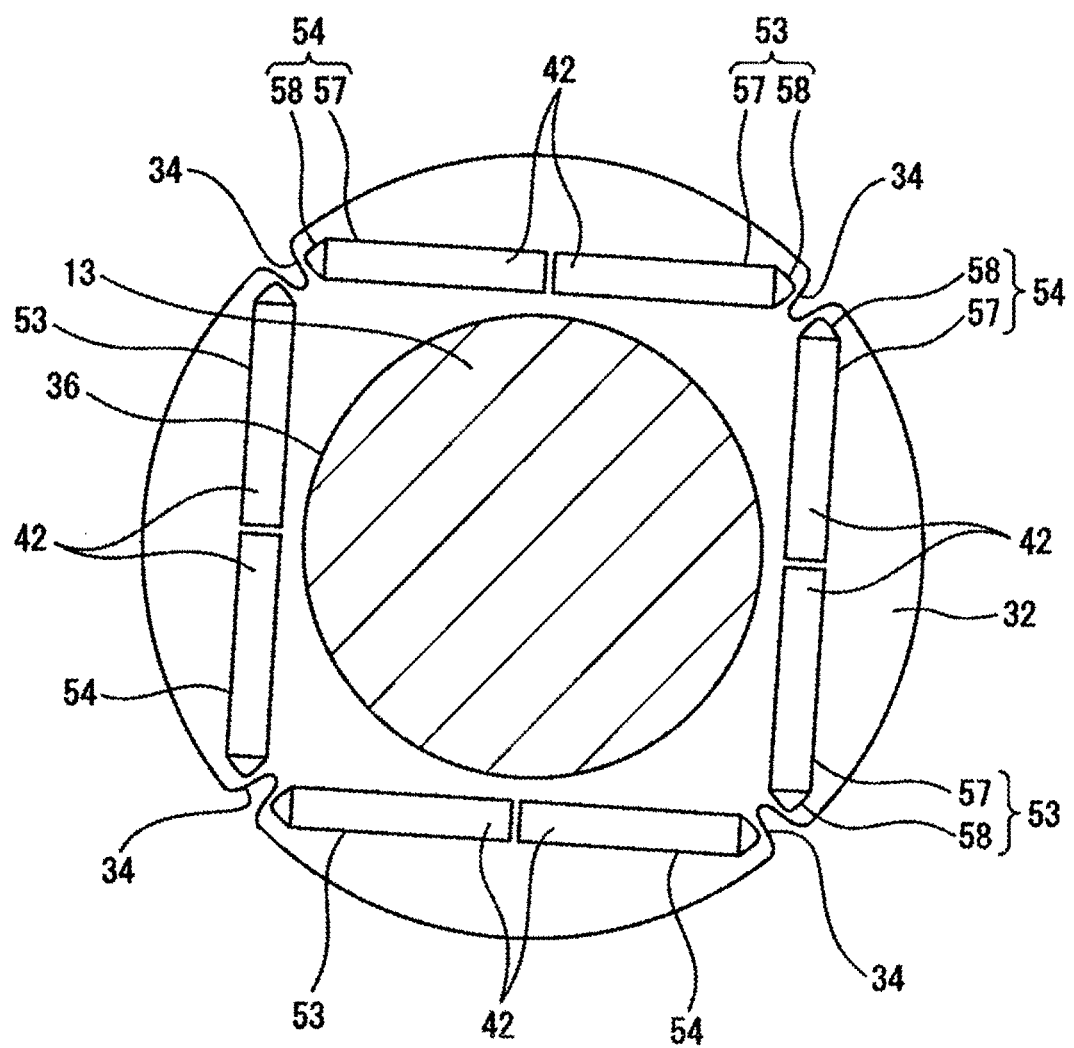
FIG. 4 is a cross-sectional view taken along line IV-IV in FIG. 2.

FIG. 4 is a cross-sectional view taken along line IV-IV in FIG. 2. FIG. 4 corresponds to a plan view of the second tubular member and the magnets. The second tubular member 32 of the present embodiment has the same shape as the first tubular member 31. With reference to FIG. 1 to FIG. 4, the second tubular member 32 includes a first magnet fixing hole 53 and a second magnet fixing hole 54 as the plurality of magnet fixing holes. The magnet 42 is fixed in each of the magnet fixing holes 53, 54. The magnet fixing holes 53, 54 each include an arrangement region 57 where the magnet is arranged, and an escape region 58 formed on a side of the arrangement region 57 and having a size that allows the magnet fixing agent to escape when the magnet 42 is inserted. The rest of the configuration of the magnet fixing holes 53, 54 is similar to the configuration of the magnet fixing hole 51, 52 of the first tubular member 31.

The second tubular member 32 includes a shaft insertion hole 36 into which the shaft 13 is inserted. The second tubular member 32 includes a recess 34 formed in the outer circumferential surface thereof. The recess 34 is formed so as to extend along the rotation axis RA. The recess 34 is formed from one end face to the other end face of the second tubular member 32. The recess 34 is formed between the magnet fixing holes 53, 54. Further, a pair of the magnet fixing holes are formed by one magnet fixing hole 53 and one magnet fixing hole 54. The recess 34 is formed between the pairs of magnet fixing holes. The recesses 34 are formed at equal intervals in the circumferential direction of the second tubular member 32. Further, the pairs of magnet fixing holes are disposed at equal intervals in the circumferential direction of the second tubular member 32. As described later, the recess 34 has a depth that allows the recess 34 to communicate with the escape region 56 of the second magnet fixing hole 52 of the first tubular member 31 when the first tubular member 31 and the second tubular member 32 are fixed to the shaft 13. The rest of the configuration of the second tubular member 32 is similar to those of the first tubular member 31.

Note that a plurality of the magnets 41 are disposed in the first tubular member 31. A plurality of the magnets 42 are disposed in the second tubular member 32. Orientations of magnetic fields of the respective magnets 41, 42 can take any form. For example, in FIG. 3, four pairs of the magnets 41 are formed. The polarity of each pair of magnets can be set to pole N, pole S, pole N, and pole S in a clockwise direction.

Thus, the rotor core 17 in the present embodiment has a shape divided into two at the center in the axial direction. Additionally, the second tubular member 32 is fixed to the shaft 13 so as to offset from the first tubular member 31 in the circumferential direction. For example, the position of the recess 33 of the first tubular member 31 is offset from the position of the recess 34 of the second tubular member 32.

Figure 5:
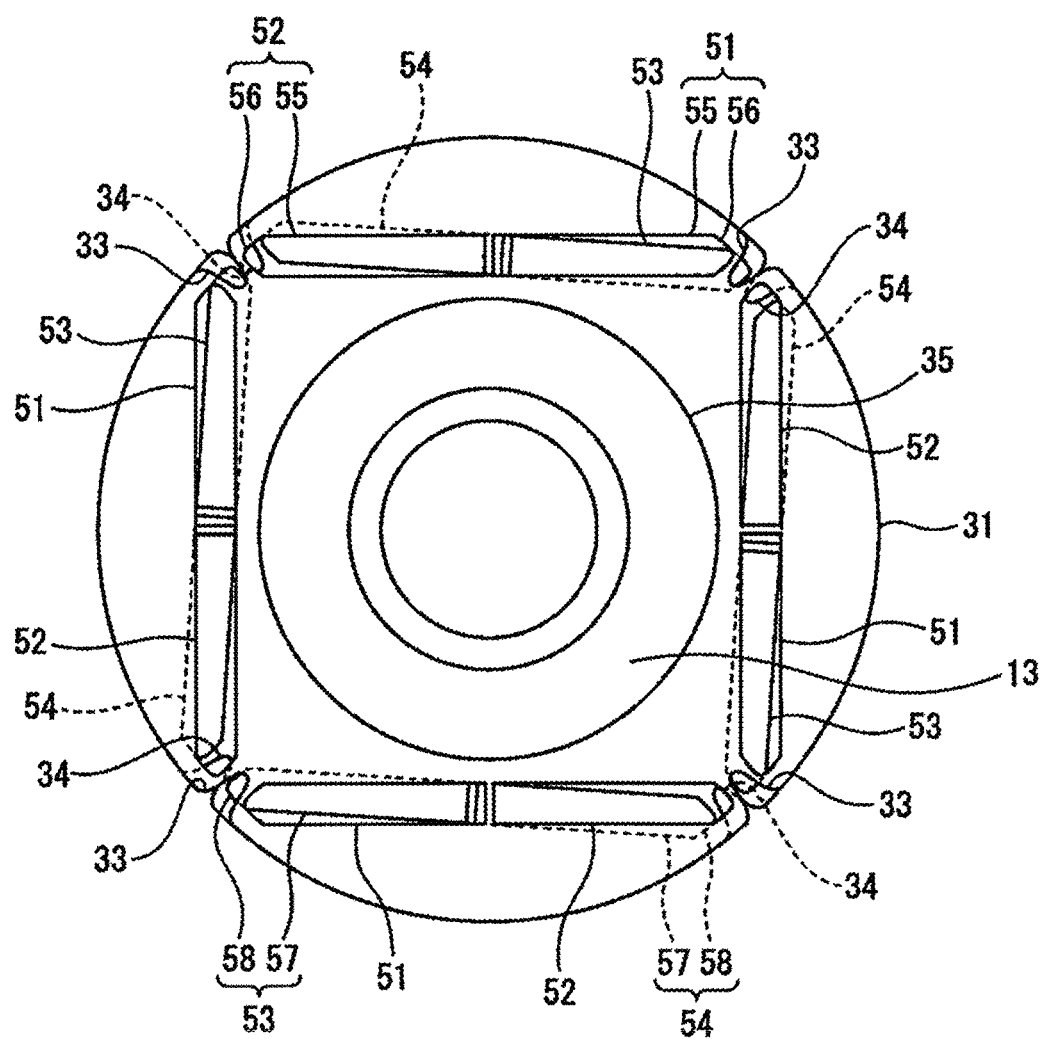
FIG. 5 is a plan view for explaining a positional relationship between a first tubular member and a second tubular member.

FIG. 5 is a plan view for explaining a positional relationship between the first tubular member and the second tubular member. FIG. 5 is a plan view of the process for manufacturing the rotor when the first tubular member 31 and the second tubular member 32 are fixed to the shaft 13. In FIG. 5, the magnets 41, 42 are not disposed in the magnet fixing holes 51, 52, 53, 54.

In the present embodiment, the first magnet fixing hole 51 of the first tubular member 31 has the same shape as the first magnet fixing hole 53 of the second tubular member 32. The second magnet fixing hole 52 of the first tubular member 31 has the same shape as the second magnet fixing hole 54 of the second tubular member 32. The second tubular member 32 is fixed in a state in which the second tubular member 32 is rotated slightly about the rotation axis RA with respect to the first tubular member 31.

The first magnet fixing hole 51 of the first tubular member 31 and the first magnet fixing hole 53 of the second tubular member 32 are communicated with each other. The second magnet fixing hole 52 of the first tubular member 31 and the second magnet fixing hole 54 of the second tubular member 32 are communicated with each other. In particular, the arrangement region 55 of the first magnet fixing hole 51 of the first tubular member 31 communicates with the arrangement region 57 of the first magnet fixing hole 53 of the second tubular member 32. The arrangement region 55 of the second magnet fixing hole 52 of the first tubular member 31 communicates with the arrangement region 57 of the second magnet fixing hole 54 of the second tubular member 32.

The recess 33 of the first tubular member 31 communicates with the escape region 58 of the first magnet fixing hole 53 of the second tubular member 32. The recess 34 of the second tubular member 32 communicates with the escape region 56 of the second magnet fixing hole 52 of the first tubular member 31.

In the rotor 11 of the present embodiment, the magnets 41, 42 can be arranged easily in the magnet fixing holes 51, 52, 53, 54 of the rotor core 17. Next, a manufacturing method of the rotor 11 of the present embodiment will be described.

First, the first tubular member 31 and the second tubular member 32 are manufactured. In each of the tubular members 31, 32, the magnet fixing holes 51, 52, 53, 54, the shaft insertion holes 35, 36, and the like are formed by punching an electromagnetic steel plate. The tubular members 31, 32 can be formed by stacking this electromagnetic steel plate.

Figure 6:
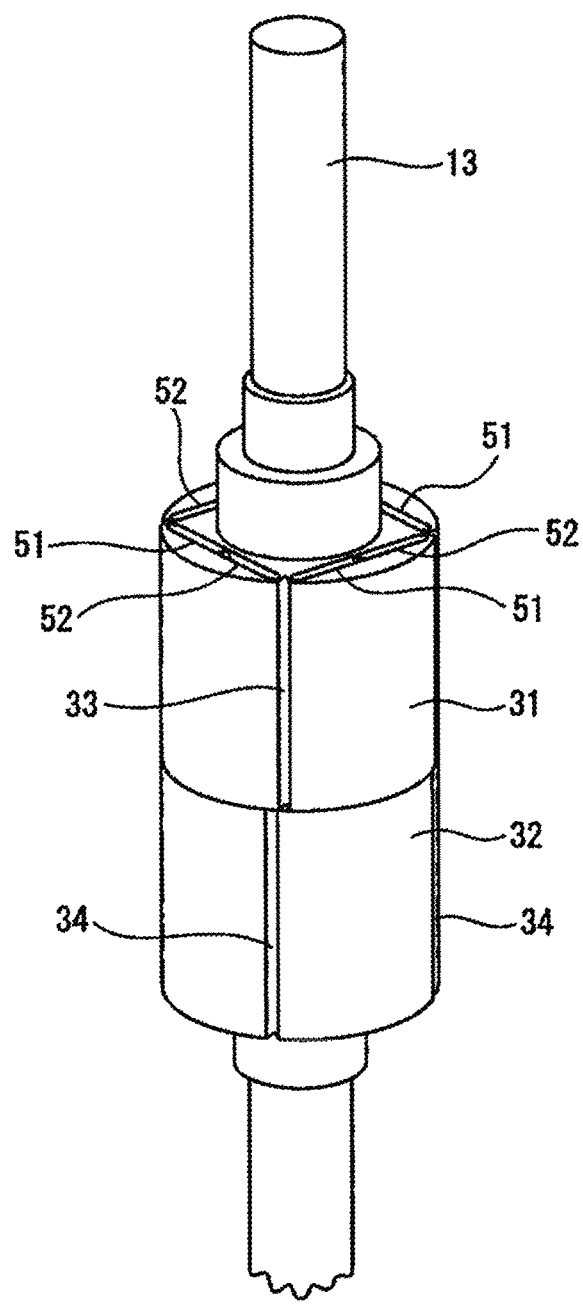
FIG. 6 is a perspective view for explaining a first step of a manufacturing method of a rotor of the embodiment.

FIG. 6 illustrates a perspective view when the first tubular member and the second tubular member are fixed to the shaft. Next, a fixation step of fixing the first tubular member 31 and the second tubular member 32 to the shaft 13 is implemented. In the fixation step, the first tubular member 31 and the second tubular member 32 are aligned side-by-side in the axial direction and fixed to the shaft 13. With reference to FIG. 5 and FIG. 6, in the present embodiment, the first tubular member 31 and the second tubular member 32 are expanded by heating. On the other hand, the shaft 13 is cooled. Then, the shaft 13 is inserted into the shaft insertion hole 35 of the first tubular member 31 and the shaft insertion hole 36 of the second tubular member 32. Subsequently, the first tubular member 31 and the second tubular member 32 can be fixed to the shaft 13 by cooling the first tubular member 31 and the second tubular member 32. Thus, in the present embodiment, the first tubular member 31 and the second tubular member 32 are fixed to the shaft 13 by shrink-fitting.

The fixation step is not limited to this embodiment, and the first tubular member and the second tubular member can be fixed to the shaft by using any method. For example, the first tubular member and the second tubular member may be fixed to the shaft by adhesive.

In the fixation step of the present embodiment, as described above, the first tubular member 31 and the second tubular member 32 are fixed with the second tubular member 32 offset from the first tubular member 31 in the circumferential direction. In the state after implementation of the fixation step, the arrangement region 55 of the magnet fixing holes 51, 52 of the first tubular member 31 and the arrangement region 57 of the magnet fixing holes 53, 54 of the second tubular member 32 communicate with each other. Furthermore, the recess 33 of the first tubular member 31 communicates with the escape region 58 of the first magnet fixing hole 53 of the second tubular member 32. The recess 34 of the second tubular member 32 communicates with the escape region 56 of the second magnet fixing hole 52 of the first tubular member 31 (refer to FIG. 5).

After this fixation step, the positional relationship between the first tubular member 31 and the second tubular member 32 does not change, and thus the relative positional relationship between the first tubular member 31 and the second tubular member 32 is maintained even in the rotor 11 after manufacture.

Figure 7:
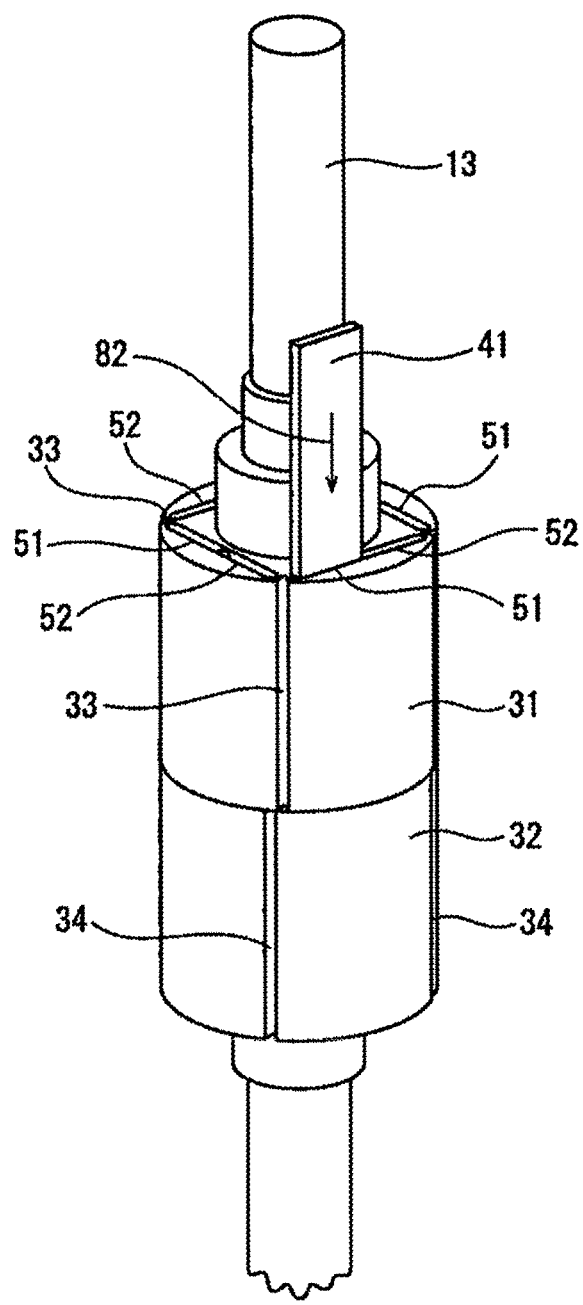
FIG. 7 is a perspective view for explaining a second step of the manufacturing method of a rotor of the embodiment.

FIG. 7 illustrates a perspective view of the rotor when the magnet is inserted into the first tubular member. Next, an insertion step of inserting the magnets 41, 42, onto which magnet fixing agent is applied, into the magnet fixing holes 51, 52 of the first tubular member 31, and the magnet fixing holes 53, 54 of the second tubular member 32 is implemented. In the insertion step, a magnet is inserted from one end face, and a magnet is inserted from the other end face of the rotor core 17.

In the present embodiment, the magnet 41 is firstly inserted into the first tubular member 31. Magnet fixing agent is applied to the magnet 41 in advance. As the magnet fixing agent, magnet fixing agent having viscosity can be used. For example, the magnet fixing agent containing an epoxy resin can be used. The magnet 41 has substantially the same length as the length of the first tubular member 31 in the axial direction. As indicated by the arrow 82, the magnet 41 is inserted into the arrangement region 55 of the first magnet fixing hole 51 of the first tubular member 31.

With reference to FIGS. 3, 5, and 7, magnet fixing agent more than an amount which is necessary for bonding is applied to the magnet 41. By inserting the magnet 41 into the arrangement region 55 of the first magnet fixing hole 51 of the first tubular member 31, excess magnet fixing agent is extruded into the escape region 56 of the first magnet fixing hole 51. Alternatively, the excess magnet fixing agent is extruded into the first magnet fixing hole 53 of the second tubular member 32. In particular, excess magnet fixing agent is extruded into the arrangement region 57 of the first magnet fixing hole 53. Thus, because there is a part where the magnet fixing agent escapes when the magnet 41 is inserted, the magnet 41 can be easily inserted into the first magnet fixing hole 51. By using this same method, the magnets 41 are inserted into all of the first magnet fixing holes 51. In this state, the magnet fixing agent may accumulate in the escape region 56 of the first magnet fixing hole 51. Next, a discharge step of discharging the magnet fixing agent accumulated in the escape region 56 is implemented.

Figure 8:
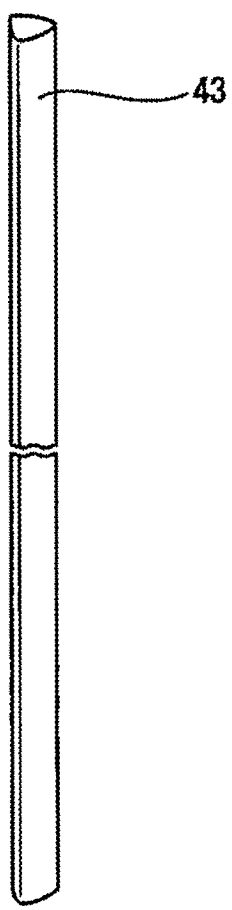
FIG. 8 is a perspective view of an insertion rod inserted into an escape region of a magnet fixing hole.

FIG. 8 illustrates a perspective view of an insertion rod for extruding magnet fixing agent accumulated in the escape region of the magnet fixing hole. An insertion rod 43 has a shape corresponding to that of the escape region of the magnet fixing hole. The insertion rod 43 has a cross-sectional shape that allows adherence to the escape regions 56, 58. The insertion rod 43 of the present embodiment is formed longer than the length of the tubular members 31, 32 in the axial direction.

Figure 9:
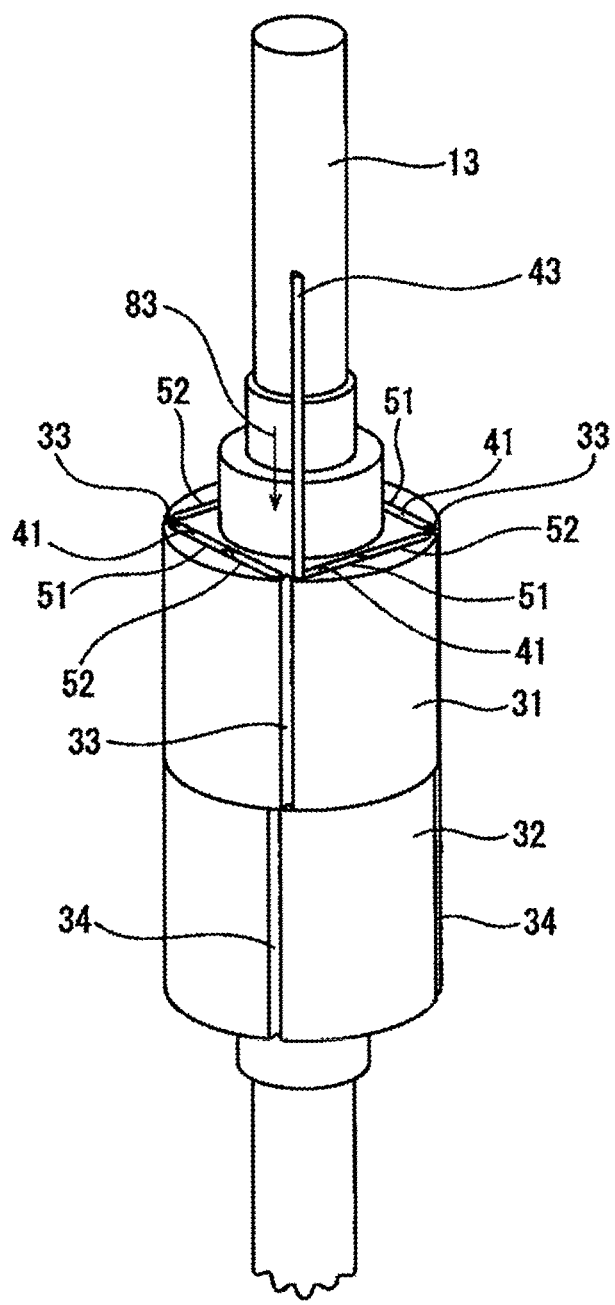
FIG. 9 is a perspective view for explaining a third step of the manufacturing method of a rotor of the embodiment.

FIG. 9 illustrates a perspective view of the rotor when the insertion rod is inserted. After insertion of the magnet 41 is completed, the insertion rod 43 is inserted into the escape region 56 of the first magnet fixing hole 51, as indicated by an arrow 83. The insertion rods 43 are inserted into the escape regions 56 of all of the first magnet fixing holes 51. By implementing this discharge step, the magnet fixing agent accumulated in the escape region 56 of the first magnet fixing hole 51 can be extruded into the first magnet fixing hole 53 of the second tubular member 32.

Note that the magnets 41 are inserted into the arrangement regions 55 of all of the first magnet fixing holes 51, and subsequently the insertion rods 43 are inserted into all of the escape regions 56 in the present embodiment, but the embodiment is not limited to this. After insertion of one magnet 41, the step of inserting one insertion rod 43 may be repeated.

Figure 10:
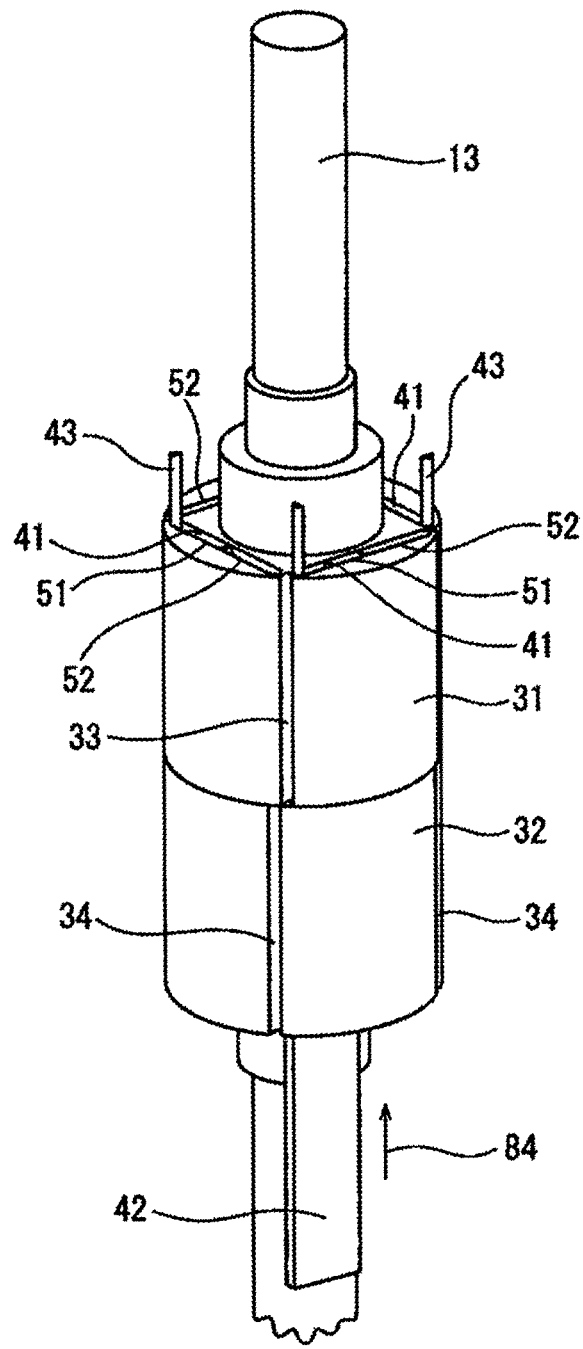
FIG. 10 is a perspective view for explaining a fourth step of the manufacturing method of a rotor of the embodiment.

FIG. 10 illustrates a perspective view of the rotor when the magnet is inserted into the second tubular member. In the first tubular member 31, a portion of the insertion rod 43 protrudes from the first magnet fixing hole 51. As described later, in the present embodiment, after the magnets 41, 42 and the insertion rods 43 are inserted into all of the magnet fixing holes 51, 52, 53, 54, a step of pulling out the insertion rods 43 is implemented.

With reference to FIGS. 4, 5, and 10, the magnet 42 is inserted into the first magnet fixing hole 53 of the second tubular member 32. The magnet 42 has substantially the same length as the length of the second tubular member 32 in the axial direction. The magnet 42 is inserted into the arrangement region 57 of the first magnet fixing hole 53 of the second tubular member 32 as indicated by an arrow 84. The magnet fixing agent may accumulate in the first magnet fixing hole 53 of the second tubular member 32. Furthermore, the magnet fixing agent is applied to a surface of the magnet 42. The magnet fixing agent accumulated in the first magnet fixing hole 53 and the excess magnet fixing agent is pushed toward an upper portion of the first magnet fixing hole 53 of the second tubular member 32.

The magnet 41 is already inserted into the first magnet fixing hole 51 of the first tubular member 31. As a result, the magnet fixing agent is moved into the escape region 58 of the first magnet fixing hole 53 of the second tubular member 32. Further, the escape region 58 of the first magnet fixing hole 53 is in communication with the recess 33 of the first tubular member 31. The magnet fixing agent can flow from the escape region 58 of the first magnet fixing hole 53 of the second tubular member 32 to the recess 33 of the first tubular member 31, and resistance by the magnet fixing agent can be suppressed. Thus, because there is a part where the magnet fixing agent escapes when the magnet 42 is inserted, the magnet 42 can be easily inserted into the first magnet fixing hole 53. Additionally, the magnet fixing agent can be prevented from remaining in the center portion of the rotor core 17.

Next, the magnets 42 are inserted into the arrangement regions 57 of all of the first magnet fixing holes 53 of the second tubular member 32. Next, a discharge step of inserting the insertion rods 43 into the escape regions 58 of all of the first magnet fixing holes 53 is implemented. By inserting the insertion rod 43, the magnet fixing agent accumulated in the escape region 58 of the first magnet fixing hole 53 can be extruded into the recess 33 of the first tubular member 31. Then, a removal step of removing the magnet fixing agent discharged to the recess 33 of the first tubular member 31 by wiping off the magnet fixing agent is implemented.

In the present embodiment, the magnets can be sequentially inserted into the magnet fixing holes that face each other in the first tubular member and the second tubular member. One magnet fixing hole among the magnet fixing holes that face each other communicates with the recess of the tubular member. The other magnet fixing hole does not communicate with the recess of the tubular member. A magnet can be inserted into the magnet fixing hole that does not communicate with the recess of the tubular member, and subsequently a magnet can be inserted into the magnet fixing hole that communicates with the recess of the tubular member. By adopting this method, the resistance of the magnet fixing agent decreases, and the magnet can be easily inserted into the magnet fixing hole.

Next, similar to the step of inserting the magnets 41, 42 and the insertion rods 43 into the first magnet fixing holes 51, 53, a step of inserting the magnets 41, 42 and the insertion rods 43 into the second magnet fixing hole 52 of the first tubular member 31 and the second magnet fixing hole 54 of the second tubular member 32 is implemented.

The magnet 42 is inserted into the arrangement region 57 of the second magnet fixing hole 54 of the second tubular member 32. Further, the insertion rod 43 is inserted into the escape region 58 of the second magnet fixing hole 54. The excess magnet fixing agent is extruded into the second magnet fixing hole 52 of the first tubular member 31. Thus, the magnet 42 can be easily inserted into the second magnet fixing hole 54. The magnets 42 and the insertion rods 43 are inserted into all of the second magnet fixing holes 54 of the second tubular member 32.

Next, the magnet 41 is inserted into the arrangement region 55 of the second magnet fixing hole 52 of the first tubular member 31. At this time, the excess magnet fixing agent and the magnet fixing agent accumulated in the arrangement region 55 of the second magnet fixing hole 52 are moved to the escape region 56 of the second magnet fixing hole 52. Alternatively, the magnet fixing agent flows into the recess 34 of the second tubular member 32 in communication with the escape region 56. Thus, the magnet 41 can be easily inserted into the second magnet fixing hole 52. Furthermore, the magnet fixing agent can be extruded into the recess 34 of the second tubular member 32 by inserting the insertion rod 43 into the escape region 56 of the second magnet fixing hole 52. Thus, the magnets 41 and the insertion rods 43 are inserted into all of the second magnet fixing holes 52 of the first tubular member 31. Then, a removal step of removing the magnet fixing agent discharged to the recess 34 of the second tubular member 32 by wiping off the magnet fixing agent is implemented.

Next, a step of pulling out all of the insertion rods 43 inserted into the escape regions 56, 58 of the magnet fixing holes 51, 52, 53, 54 is implemented. The insertion step of the present embodiment includes a step of inserting the insertion rods 43 into the escape regions 56, 58 after the magnets 41, 42 are inserted into the arrangement regions 55, 57 of the magnet fixing holes 51, 52, 53, 54. The insertion step includes a step of pulling out all of the insertion rods 43 after the magnets 41, 42 and the insertion rods 43 are inserted into all of the magnet fixing holes 51, 52, 53, 54. By adopting this method, the magnet fixing agent that remains in the escape regions 56, 58 can be removed.

Note that the insertion rods can be pulled out after the magnets and the insertion rods are inserted into the magnet fixing holes that communicate with each other in the first tubular member and the second tubular member. For example, the insertion rods 43 may be pulled out after the magnets 41, 42 and the insertion rods 43 have been inserted into the first magnet fixing hole 51 and the first magnet fixing hole 53. Subsequently, the magnets 41, 42 and the insertion rods 43 may be inserted into the second magnet fixing hole 52 and the second magnet fixing hole 54. According to this method as well, the magnet fixing agent that remains in the escape regions 56, 58 can be removed.

Figure 11:
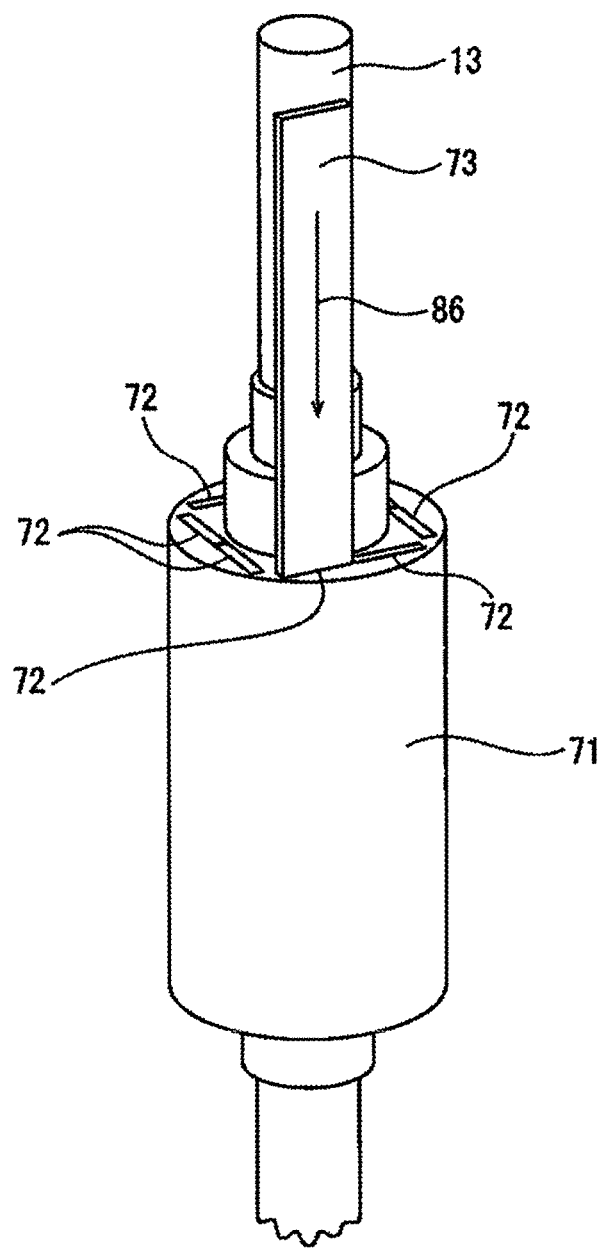
FIG. 11 is a perspective view of the rotor for explaining the manufacturing method of a rotor of a comparative example.
Figure 12:
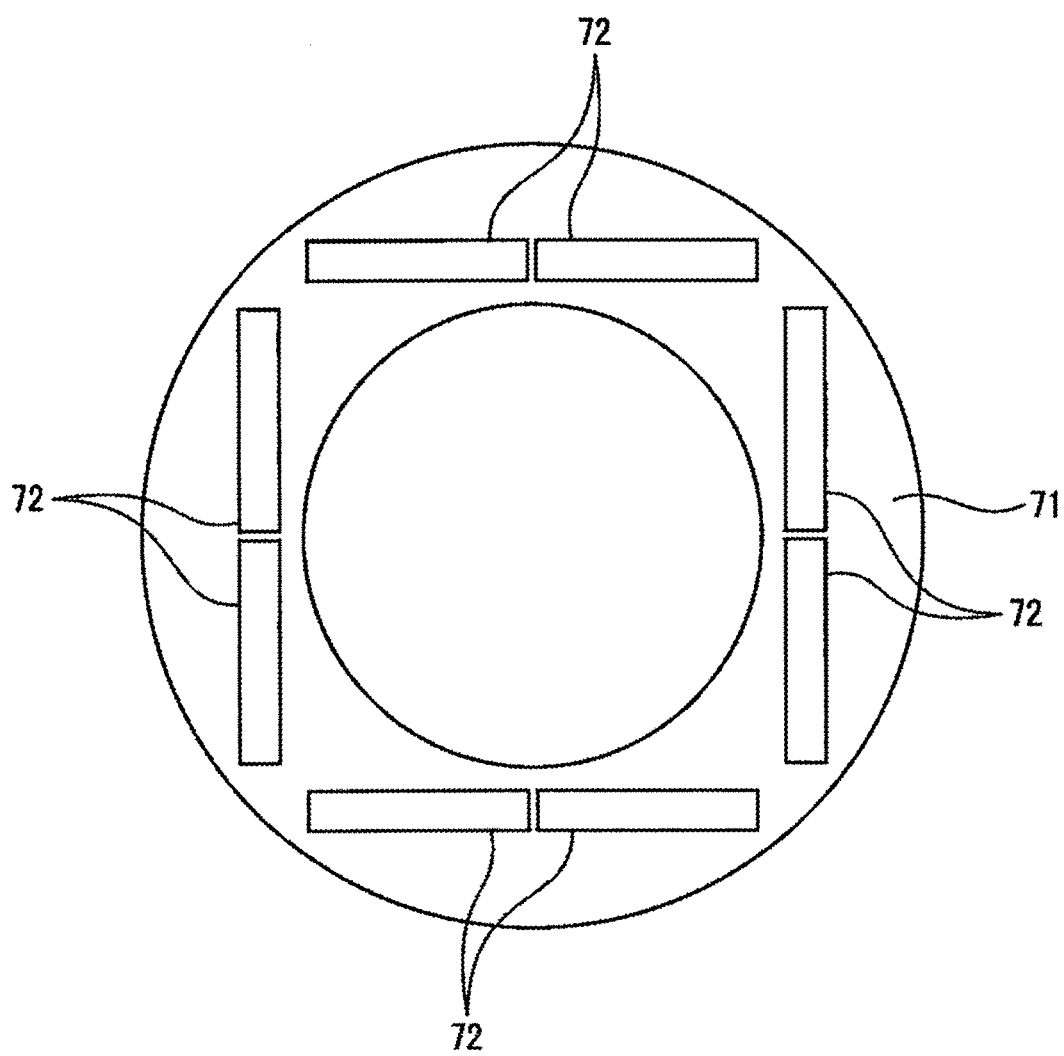
FIG. 12 is a plan view of a rotor core of the comparative example.

FIG. 11 illustrates a perspective view of the rotor of a comparative example. FIG. 12 illustrates a plan view of the rotor core of the rotor of the comparative example. With reference to FIG. 11 and FIG. 12, the rotor of the comparative example includes a rotor core 71. The rotor core 71 is integrally formed without being divided in the axial direction. The rotor core 71 includes magnet fixing holes 72 extending in the axial direction. The magnet fixing holes 72 are each formed so as to correspond to a cross-sectional shape of a magnet 73. That is, the magnet fixing hole 72 includes only the arrangement region and not the escape region.

In the rotor of the comparative example, the magnet 73 is inserted as indicated by an arrow 86. The magnet 73 has substantially the same length as the length of the rotor core 71 in the axial direction. When the magnet 73 is inserted, the length of insertion relating to the magnet fixing hole 72 is increased. For this reason, there is the problem that the resistance caused by the magnet fixing agent is increased and insertion takes a long time.

Alternatively, the magnet 73 can be divided into two in the axial direction. A magnet can be inserted from one end face, and a magnet can be inserted from the other end face of the rotor core 71. However, in this case as well, the time required to insert the magnet increases due to the resistance of the magnet fixing agent. Further, the excess magnet fixing agent remains in the center portion of the magnet fixing hole 72 in the axial direction. As a result, when the magnet is inserted from the other end face, the magnet may not be insertable to the predetermined position. Alternatively, a static balance or a dynamic balance of the rotor may be deteriorated due to different amounts of magnet fixing agent remaining in the respective magnet fixing holes.

In contrast, in the rotor and the manufacturing method of the rotor of the present embodiment, there is a part where the magnet fixing agent escapes when the magnet is inserted into the magnet fixing hole, and thus the resistance of the magnet fixing agent can be reduced. As a result, the magnet can be easily inserted into the magnet fixing hole. The magnet can be inserted into the rotor core in a short period of time. Furthermore, the excess magnet fixing agent is ultimately discharged into the recess of the tubular member, and thus the magnet can be inserted to the predetermined position. Further, because the excess magnet fixing agent does not remain in the magnet fixing hole, the deterioration of the static balance and the dynamic balance can be suppressed.

In the present embodiment, the first tubular member 31 and the second tubular member 32 have the same shape. By adopting this configuration, the tubular members can be easily manufactured. Note that the first tubular member and the second tubular member may differ in shape from each other. In this case as well, the magnet fixing holes can be formed so that the magnet fixing hole of one tubular member and the magnet fixing hole of the other tubular member communicate with each other. Further, the magnet fixing hole and the recess can be formed so that the escape region of the magnet fixing hole of one tubular member communicates with the recess of other tubular member.

While the recesses 33, 34 in the present embodiment are formed from one end face to the other end face in the axial direction in the respective tubular members 31, 32, the embodiment is not limited to this. The recess can be formed at a predetermined length from an end surface where the tubular members come into contact with each other. The recess may be formed so that the magnet fixing agent discharged from the escape region of the magnet fixing hole can be accumulated.

Figure 13:
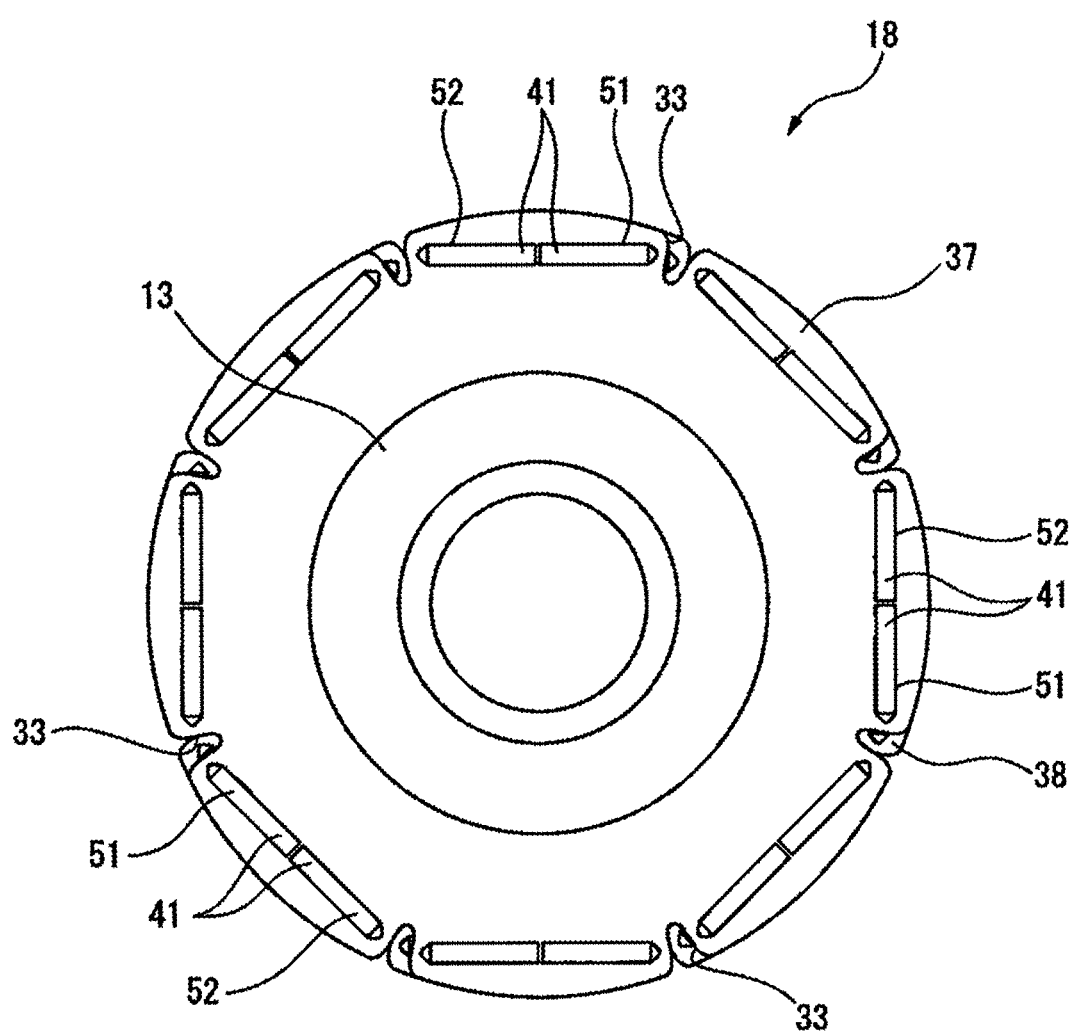
FIG. 13 is a plan view of another rotor of the embodiment.

FIG. 13 is a plan view of another rotor of the present embodiment. While a rotor including four magnet fixing hole pairs was illustrated in the description above, the embodiment is not limited to this. The configuration and manufacturing method of the rotor of the present embodiment can be applied to a rotor that includes any number of pairs of magnet fixing holes.

A rotor 18 illustrated in FIG. 13 includes a first tubular member 37 and a second tubular member 38 having the same shape as the first tubular member 37. The first tubular member 37 includes eight pairs of the magnet fixing holes 51 and the magnet fixing holes 52. Further, the recess 33 is formed in a region between the pairs of magnet fixing holes in an outer circumferential surface of the first tubular member 37. A magnet fixing hole and a recess similar to those of the first tubular member 37 are also formed in the second tubular member 38. In such a rotor core as well, the tubular members can be fixed to the shaft so that the escape region of the magnet fixing hole of one tubular member and the recess of the other tubular member communicate with each other.

Furthermore, a pair of the first magnet fixing hole and the second magnet fixing hole is formed in the rotor core of the present embodiment, but the embodiment is not limited to this. The configuration of the recess and the magnet fixing hole of the tubular members of the present embodiment can also be applied to a rotor in which pairs of magnet fixing holes (pairs of magnets) are not formed.

In both the first magnet fixing holes 51, 53 and the second magnet fixing holes 52, 54 of the present embodiment, the arrangement region 55 of the first tubular member 31 is in communication with the arrangement region 57 of the second tubular member 32. Furthermore, the recess of one tubular member is formed so as to communicate with the escape region of the other tubular member. However, the embodiment is not limited to this. Among the first magnet fixing hole and the second magnet fixing hole, one magnet fixing hole may have the configuration of the present embodiment, and the other magnet fixing hole may not have the configuration of the present embodiment.

In addition, the insertion rod inserted into the escape region of each magnet fixing hole is pulled out in the manufacturing process of the present embodiment, but the embodiment is not limited to this. For example, an insertion rod formed from a material that does not adversely affect the magnetic flux is prepared. The insertion rod is formed to the same length as that of the magnet. Then, along with fixing the magnet, the insertion rod may be fixed in the escape region.

According to an aspect of the present disclosure, it is possible to provide a rotor of a magnet-embedded electric motor that is easily manufactured and a manufacturing method of a rotor of a magnet-embedded electric motor.

In the manufacturing method described above, the sequence of steps may be changed as appropriate, within such a range that the functionality of the step is not changed. The above-described embodiments can be combined as appropriate. Identical or equivalent parts are given identical reference numerals in the above-described drawings. Note that the above-described embodiments are merely examples and are not intended to limit the invention. Changes to the embodiments as indicated in the claims are also included in the embodiments.

The invention claimed is:

1. A rotor of a magnet-embedded electric motor comprising:
   a shaft configured to rotate about a rotation axis;
   a rotor core fixed to the shaft; and
   a magnet fixed in the rotor core; wherein
   the rotor core includes a first tubular member and a second tubular member coaxially fixed to the shaft,
   the first tubular member includes a plurality of magnet fixing holes each with a magnet fixed by magnet fixing agent, and a recess formed in a region between the magnet fixing holes in an outer circumferential surface and extending along the rotation axis,
   the second tubular member includes a plurality of magnet fixing holes each with a magnet fixed by magnet fixing agent,
   each magnet fixing hole included in the first tubular member and the second tubular member has a closed shape in cross section perpendicular to the rotation axis so that the magnet is arranged inside the magnet fixing hole, and is formed inside each tubular member, the recess is formed away from the magnet fixing hole in the outer circumferential surface of the first tubular member, the magnet fixing hole includes an arrangement region where the magnet is arranged, and an escape region formed on a side of the arrangement region and having a size configured to allow the magnet fixing agent to accumulate, and the second tubular member is fixed offset from the first tubular member in a circumferential direction so that the arrangement region of the first tubular member communicates with the arrangement region of the second tubular member and the recess of the first tubular member communicates with the escape region of the second tubular member.

2. The rotor of a magnet-embedded electric motor according to claim 1, wherein the second tubular member includes a recess formed between the magnet fixing holes in an outer circumferential surface and extending along the rotation axis, the plurality of magnet fixing holes include pairs of magnet fixing holes of a first magnet fixing hole and a second magnet fixing hole, the plurality of pairs of magnet fixing holes are formed in the circumferential direction of the tubular member, the recess of each tubular member is formed between the pairs of magnet fixing holes, and the first tubular member and the second tubular member are fixed so that the recess of the first tubular member communicates with the escape region of the first magnet fixing hole of the second tubular member and the recess of the second tubular member communicates with the escape region of the second magnet fixing hole of the first tubular member.

3. The rotor of a magnet-embedded electric motor according to claim 1, wherein the recess of each tubular member is formed from one end face to the other end face of the tubular member.

4. The rotor of a magnet-embedded electric motor according to claim 1, wherein the second tubular member has the same shape as the first tubular member.

* * * * *